Aug. 23, 1966 L. J. G. BURSKI 3,268,798
ADJUSTABLE VOLTAGE CONTROL CIRCUIT
Filed April 27, 1962
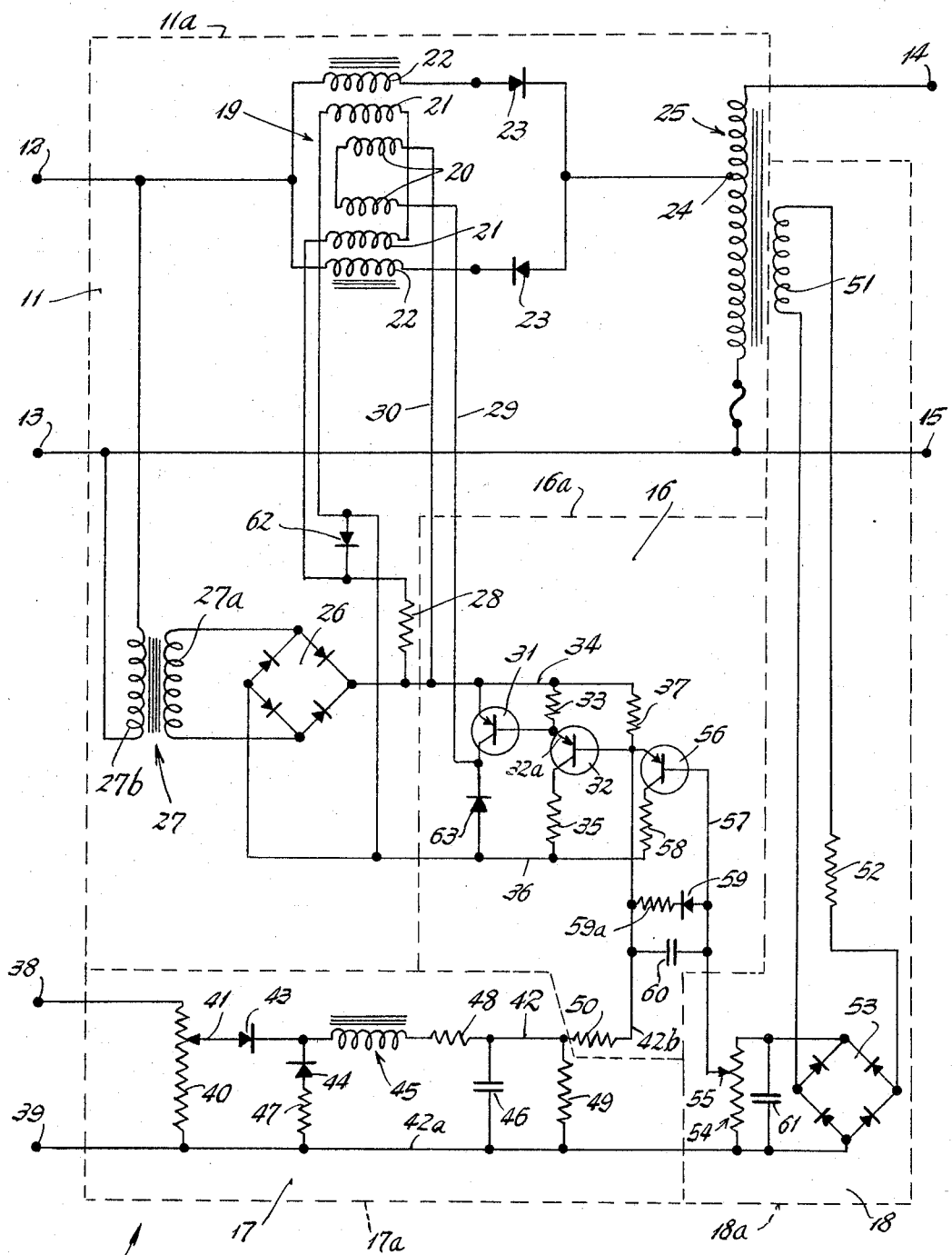
INVENTOR.
Leonard J. G. Burski
BY
Johnson and Kline
ATTORNEYS

United States Patent Office 3,268,798
Patented August 23, 1966

3,268,798
ADJUSTABLE VOLTAGE CONTROL CIRCUIT
Leonard J. G. Burski, Bristol, Conn., assignor to The Superior Electric Company, Bristol, Conn., a corporation of Connecticut
Filed Apr. 27, 1962, Ser. No. 190,652
5 Claims. (Cl. 323—66)

The present invention relates to a voltage control circuit for maintaining substantially constant a value of alternating current voltage supplied to a load circuit and more particularly to such a circuit in which the value of voltage that is maintained substantially constant may be adjusted over a wide range.

While it has heretofore been proposed to employ adjustable voltage control circuits, these devices have not been completely satisfactory particularly where the adjusting structure is desired to be considerably remote from the rest of the control circuit. Thus there has heretofore been required that the adjusting structure be connected to the rest of the circuit and the heavy control currents which are objectionable be carried by the connection. Moreover, said heretofore devices have had complex circuitry in order to achieve the maintenance of the output voltage substantially constant and to provide for adjusting the output voltage.

It is accordingly an object of the present invention to provide a control circuit for maintaining an output value voltage substantially constant and in which the voltage may be adjusted without the above-noted deficiencies in heretofore known devices.

Another object of the present invention is to provide an adjustable voltage control circuit of the above type in which only small current is required from a remotely positioned adjusting means and in which the circuit is simple in construction and reliable in use.

A further object of the present invention is to provide an adjustable voltage control circuit having a remote adjusting means which is accurate in maintaining the adjusted voltage which is not sensitive to alternating current phases and which has a relatively rapid speed of response in maintaining the output voltage at the adjusted value.

In carrying out the present invention, the adjustable voltage control circuit hereinafter disclosed includes a power circuit which is connected between an alternating current input and the load circuit to which it supplies and to which it maintains an adjusted voltage substantially constant. The power circuit is controlled by a signal circuit which produces a control signal for effecting operation of the power circuit to maintain the output voltage susbtantially constant. The signal circuit has an input that receives a voltage signal that is proportional to the actual output voltage from an error circuit and also receives a voltage signal from an adjustable control circuit. The control circuit is adjustable and by varying its voltage signal effects operation of the signal circuit to cause the regulation of the value of the output voltage to the desired value set by the adjustable control means. With the control means having been adjusted, the error circuit and control circuit provide continuous voltage signals to the signal circuit for maintaining the output voltage substantially constant even with changes in the power required by the load circuit and rapid changes in the input voltage.

Other features and advantages will hereinafter appear.

The sole figure is an electrical schematic diagram of the present invention.

Referring to the drawing, the adjustable voltage control circuit of the present invention is generally indicated by the reference numeral 10 and includes a power circuit 11 enclosed within the dotted line 11a for controlling the power between a pair of input terminals 12 and 13 adapted to be connected to a source of alternating current and load terminals 14 and 15 to which a load circuit is to be connected. A signal circuit 16, enclosed within dotted lines 16a, provides to the power circuit a control signal for effecting regulation of the input voltage to the desired value of output voltage and to maintain the output voltage substantially constant at said adjusted value. For adjusting the output value there is provided an adjustable control circuit 17 enclosed within dotted lines 17a and this circuit, which preferably has only a few elements remotely positioned from the power and signal circuits, provides a voltage signal to the signal circuit that is proportional to the desired value of output voltage. An error circuit 18, enclosed within dotted line 18a, provides for continuous monitoring of the output voltage to provide a voltage signal that is proportional to the actual output voltage.

Referring to the power circuit 11, there is provided a magnetic amplifier 19 having control windings 20, bias windings 21 and load windings 22. The load windings are coupled through diodes between the input terminals 12 and 13 and a tap 24 to a step-up transformer 25 with one end of the transformer 25 being connected to the output terminal 14. The other input terminal 13 is connected to the output terminal 15. The magnetic amplifier is of the self-saturating type by reason of the diodes 23.

For magnetically biasing the magnetic amplifier there is connected to the bias windings 21 a full-wave rectifier 26 that receives alternating current from a secondary winding 27a of a transformer 27 having its primary winding 27b connected across the input terminals 12 and 13. A resistor 28 limits the value of the unidirectional current in the bias windings to provide sufficient flux in the magnetic amplifier to set the operating point of the magnetic amplifier at full impedance when the control signal is minimum.

The signal circuit 16, through a pair of leads 29 and 30, provides a signal or control current to the control windings 20 for regulating the impedance of the magnetic amplifier 19. The value of the current is determined by the conductance in the emitter-collector path of a transistor 31 connected across the output of the rectifier 26. In order to vary the conductance in this path of the transistor 31, there is provided a second transistor 32 having a temperature compensating and biasing resistor 33 connected between a positive line 34 of the rectifier 26 and its emitter 32a such that varying the conductance in the emitter-collector path of the transistor 32 varies the voltage at the base of the transistor 31 and thus varies its emitter-collector conductance. A current limiting resistor 35 for limiting current in the emitter-collector of transistor 32 is connected between the negative lead 36 of the rectifier 26 and the collector of transistor 32. For temperature compensation to prevent drift the emitter-base path of the transistor 32 has a resistor 37 connected between the plus lead 34 and the base of transistor 32.

It will be appreciated that the transistors 31 and 32 form an amplifying circuit so that changes in the emitter-base current of transistor 32, for example, an increase in current, increases the conduction in the emitter-collector current of transistor 31 and hence an increase in current flow to the control windings 20 of the magnetic amplifier 19 while a decrease in current decreases the control current. Moreover with less control current in the magnetic amplifier there is a larger voltage drop across the magnetic amplifier and hence the input voltage is in effect decreased to the desired output voltage while a greater value of control current effects a lesser voltage drop across the magnetic amplifier with subsequent lesser decrease of the value of output voltage.

In carrying out the present invention, the adjustable control circuit 17 has a pair of input terminals 38 and 39 which are preferably connected to a source of alternating current. An adjustable potentiometer 40 having a slider 41 is connected across the input terminals 38 and 39 and provides a voltage between the leads 42 and 42a that is proportional to the setting of the slider 41 of the potentiometer 40. Diode 43 rectifies the alternating current into unidirectional current while diode 44, inductance 45 and capacitor 46 serve to smooth the rectified unidirectional current. Resistors 47, 48 and 49 are current limiting and provide a value of unidirectional voltage between the leads 42 and 42a which is proportional to the setting of the slider 41 and of a magnitude which, as will be hereinafter apparent, is proper for the signal circuit. A resistor 50 is part of the signal circuit and serves as a voltage dropping and filtering resistor to limit the current passing through the leads 42b to the signal circuit.

The error circuit 18 continuously provides a unidirectional voltage signal which is proportional to the actual output voltage at the output terminals 14 and 15 and includes a transformer winding 51 which may form part of the transformer 25 or be a separate transformer connected across the leads 14 and 15, a current limiting resistor 52 and a rectifying bridge 53. The output of the bridge 53 appears across a variable potentiometer 54 having a tap 55 with the unidirectional voltage signal of the error circuit accordingly being between the tap 55 and the lead 42a which thus places one end of both potentiometers 40 and 54 at the same potential.

The adjustable control circuit signal voltage and the signal voltage of the error circuit, according to the present invention, are fed to the signal circuit which has a variable conductor so that the difference in value between the two voltages determines the conductance of the conductor. Specifically the present invention employs a PNP type transistor 56 as the variable conductor with the lead 42b being connected to its emitter and the tap 55, by the lead 57, being connected to its base. The emitter-collector circuit of transistor 56 is connected across the rectifier 26 and includes the resistor 37 and a current limiting resistor 58. The base of transistor 32 is also connected to the emitter of transistor 56.

With this structure the variable potentiometer in the adjustable control circuit is initially adjusted to provide full output voltage and the potentiometer is adjusted to make the full output voltage be that at which the circuit of the present invention is maintained. The potentiometer 54 is adjustable only for initially setting of the electric control circuit in order to provide for tolerances in the elements. Naturally, if the value of the elements changes subsequently such changes may be obviated by another adjustment of the potentiometer 54.

The value of the potential difference between the leads 42 and 57 determines the current conduction in the emitter-base of transistor 56 which controls the conduction in its emitter-collector path. The value of the control circuit signal voltage is directly proportional to the setting of the slider 41 and the value of the error circuit signal voltage is directly proportional to the output voltage across the terminals 14 and 15. The error circuit signal voltage, even at the lowest setting except zero of output voltage, is less than the adjustable control circuit signal voltage and as both signal voltages are directly proportional the error circuit signal voltage is always less than the adjustable control signal voltage except under abnormal conditions. Moreover, as both signal voltages are directly proportional, as the output voltage decreases, the difference between the control circuit signal voltage and the error circuit signal voltage will also increase in proportion. Accordingly with this increased potential difference between the leads 42 and 57 a higher conduction in the emitter-collector path of the transistor 56 will occur causing greater conduction in the emitter-collector path of transistor 32 and increasing the conduction in the emitter-collector path of transistor 31 thereby increasing the current in the control windings 20 that decreases the impedance of the magnetic amplifier with subsequent increase in output voltage at the terminals 14 and 15. Conversely, if the adjustable control circuit potentiometer 40 is adjusted for a value of output voltage of low magnitude there will be less potential between the emitter and base of transistor 56 with consequent decrease in the control current in the control windings 20 and an increase in the impedance of the magnetic amplifier that effects a lowering of the output voltage.

With the above-noted structure it will also be clear that if the output voltage should increase beyond that set by the adjustable control circuit, the error circuit signal voltage will increase proportionately, decreasing the potential between the leads 42 and 57 and the current in the emitter-base path of transistor 56 which would decrease the control current in the control winding 20, effecting an increase in the impedance of the magnetic amplifier to thereby decrease the output voltage to the value selected by the control circuit. Conversely, if the output voltage is lower than that set by the control circuit, there is a decrease in impedance of the magnetic amplifier by an increased current flowing in the emitter-base path of transistor 56.

Normally, the value of the signal voltage from the error circuit is maintained at less value than the signal voltage of the control circuit by the values of the resistances and only becomes larger under abnormal transient conditions. To prevent it from becoming excessive to effect malfunctioning of the transistor 56, a semiconductor 59 and resistance 59a are connected across the leads 57 and 42b to be conductive from the former to the latter. As the transistor 56 is a PNP type, it is rendered conducting by the emitter being positive with respect to the base and hence the error circuit signal voltage is negative with respect to the adjustable control circuit signal voltage. If an NPN type of transistor is employed, however, the connection to such a transistor from the adjustable control circuit and the error circuit will be reversed from that shown for the PNP type.

A filter 60 is provided connected across the two leads 42b and 57 for minimizing the ripple effect in the voltages as is a condenser 61 coupled across the rectifier 53.

In order to prevent sudden surges of voltage caused by transient action in the magnetic amplifier from causing damage in the control circuit, there is provided a diode 62 connected between the leads from the rectifier 26 to the bias windings and this diode short circuits transient voltage surges generated in the magnetic amplifier. Also the diode 62 functions to prevent such transient voltages from damaging the transistors 31, 32 and 56. Moreover, another diode 63 is connected between the negative lead 36 and the collector of transistor 31 to also obviate damage from such transient voltages.

It will accordingly be appreciated that there has been disclosed an adjustable voltage control circuit which is simple in construction, reliable in use yet effective to maintain substantially constant an output voltage that may be adjusted. The means for adjusting may conveniently, if desired, be remotely positioned from the balance of the voltage control circuit and yet by reason of the above disclosed structure requires only that a minute current pass to the balance of the control circuit to effect the change in voltage upon its operation. Moreover, according to the present invention, the output voltage is continually sensed by an error circuit which supplies a signal voltage that is compared with the signal voltage from the control circuit to effect changes in the power circuit upon the output voltage deviating from its adjusted value.

Variations and modifications may be made within the scope of the claims and portions of the improvements may be used without others.

I claim:

1. An adjustable voltage control circuit for providing an output voltage to a load circuit that is adjustable in value and maintainable at an adjusted value comprising input terminals adapted to be connected to a source of alternating current, output terminals adapted to be connected to the load circuit, power means positioned between the input and output terminals and repsonsive to a control signal for controlling the output voltage, an adjustable control means for supplying a unidirectional voltage signal from substantially zero to maximum proportional to the value of output voltage desired, error means operatively associated with the output terminals for producing a unidirectional voltage signal proportional to the value of the output voltage, a transistor having a base, emitter and collector, means for applying the signal voltage of the adjustable control means and the signal voltage of the error means across the emitter-base of the transistor to vary the conductivity in the emitter-collector thereof, and means for sensing the conductivity of the transistor and supplying a control signal related thereto to the power means to thereby control the voltage at the output terminals.

2. An adjustable voltage control circuit for providing an output voltage to a load circuit that is adjustable in value and maintainable at an adjusted value comprising input terminals adapted to be connected to a source of alternating current, output terminals adapted to be connected to the load circuit, power means positioned between the input and output terminals and responsive to a control signal for controlling the output voltage, an adjustable control means for supplying a unidirectional voltage signal from substantially zero to maximum proportional to the value of output voltage desired, error means operatively associated with the output terminals for producing a unidirectional voltage signal proportional to the value of the output voltage, a transistor having a base, emitter and collector, means for applying the signal voltage of the adjustable control means and the signal voltage of the error means across the emitter-base of the first transistor to vary the conductivity in the emitter-collector thereof, and means for sensing the conductivity of the transistor and supplying a control signal related thereto to the power means to thereby control the voltage at the output terminals, said means including another transistor having its base coupled to the emitter-collector path of the first transistor.

3. An adjustable voltage control circuit for providing an output voltage to a load circuit that is adjustable in value and maintainable at an adjusted value comprising input terminals adapted to be connected to a source of alternating current, output terminals adapted to be connected to the load circuit, power means positioned between the input and output terminals and responsive to a control signal for controlling the output voltage, an adjustable control means for supplying a unidirectional voltage signal from substantially zero to maximum proportional to the value of output voltage desired, error means operatively associated with the output terminals for producing a unidirectional voltage signal proportional to the value of the output voltage, a transistor having a base, emitter and collector, means for applying the signal voltage of the adjustable control means and the signal voltage of the error means across the emitter-base of the transistor to vary the conductivity in the emitter-collector thereof, the value of the voltage signal of the error means as applied to the transistor being normally maintained less than the value of the voltage signal from the adjustable control means to normally maintain said transistor conducting, and means for sensing the conductivity of the transistor and supplying a control signal related thereto to the power means to thereby control the voltage at the output terminals.

4. The invention as defined in claim 3 in which the error means includes an adjustable means for setting the proportion of the value of the voltage signal of the error means to the value of the output voltage.

5. An adjustable voltage control circuit for providing an output voltage to a load circuit that is adjustable in value and maintainable at an adjusted value comprising input terminals adapted to be connected to a source of alternating current, output terminals adapted to be connected to the load circuit, power means positioned between the input and output terminals and responsive to a control signal for controlling the output voltage, an adjustable control means for supplying a unidirectional voltage signal from substantially zero to maximum proportional to the value of output voltage desired, error means operatively associated with the output terminals for producing a unidirectional voltage signal proportional to the value of the output voltage, a transistor having a base, emitter and collector, means for applying the signal voltage of the adjustable control means and the signal voltage of the error means across the emitter-base of the first transistor to vary the conductivity in the emitter-collector thereof, the value of the voltage signal of the error means as applied to the transistor being normally maintained less than the value of the voltage signal from the adjustable control means to normally maintain said transistor conducting, and means for sensing the conductivity of the transistor and supplying a control signal related thereto to the power means to thereby control the voltage at the output terminals, said means including another transistor having its base coupled to the emitter-collector path of the first transistor and said means including limiting means for limiting the voltage value of the control signal to prevent malfunctioning caused by surge voltages in the circuit.

References Cited by the Examiner
UNITED STATES PATENTS

| | | | |
|---|---|---|---|
| 2,753,512 | 7/1956 | Helterline et al. | 323—66 X |
| 2,753,514 | 7/1956 | Muchnick | 323—66 |
| 2,798,571 | 7/1957 | Schaelchlin et al. | 321—25 X |
| 2,810,877 | 10/1957 | Silver | 321—25 X |
| 2,850,694 | 9/1958 | Hamilton | 323—66 X |
| 2,858,499 | 10/1958 | Silver | 321—25 X |
| 2,913,657 | 11/1959 | Erickson | 323—43.5 |
| 2,914,720 | 11/1959 | Merkel | 321—25 X |
| 2,961,594 | 11/1960 | Mah | 321—25 X |
| 2,973,328 | 5/1960 | Huge et al. | 323—66 X |
| 3,042,848 | 7/1962 | Muchnick et al. | 321—25 X |
| 3,045,170 | 7/1962 | Howald | 321—25 X |
| 3,098,193 | 7/1963 | Wallace et al. | 323—66 |

JOHN F. COUCH, *Primary Examiner.*

LLOYD McCOLLUM, MILTON O. HIRSHFIELD,
*Examiners.*

W. E. RAY, *Assistant Examiner.*